Sept. 16, 1969　　　　O. T. CASEBEER　　　　3,467,827
FOOTAGE INDICATOR FOR A PERFORATED FILM STRIP IN
WHICH THE SPROCKET HOLES ARE SENSED
USING NONACTINIC RADIATION
Filed Feb. 10, 1967

INVENTOR.
ORAN T. CASEBEER
BY
ATTORNEYS

United States Patent Office 3,467,827
Patented Sept. 16, 1969

3,467,827
FOOTAGE INDICATOR FOR A PERFORATED FILM STRIP IN WHICH THE SPROCKET HOLES ARE SENSED USING NONACTINIC RADIATION
Oran T. Casebeer, Interlaken, N.Y., assignor to Eastman Kodak Company, Rochester, N.Y., a corporation of New Jersey
Filed Feb. 10, 1967, Ser. No. 615,156
Int. Cl. H01j 39/12
U.S. Cl. 250—214                           1 Claim

ABSTRACT OF THE DISCLOSURE

Light is directed through the sprocket holes of a moving strip of film toward a photocell. The resultant pulses of light cause the photocell to emit current pulses, which are counted to determine the length of the film.

---

Figure 1:
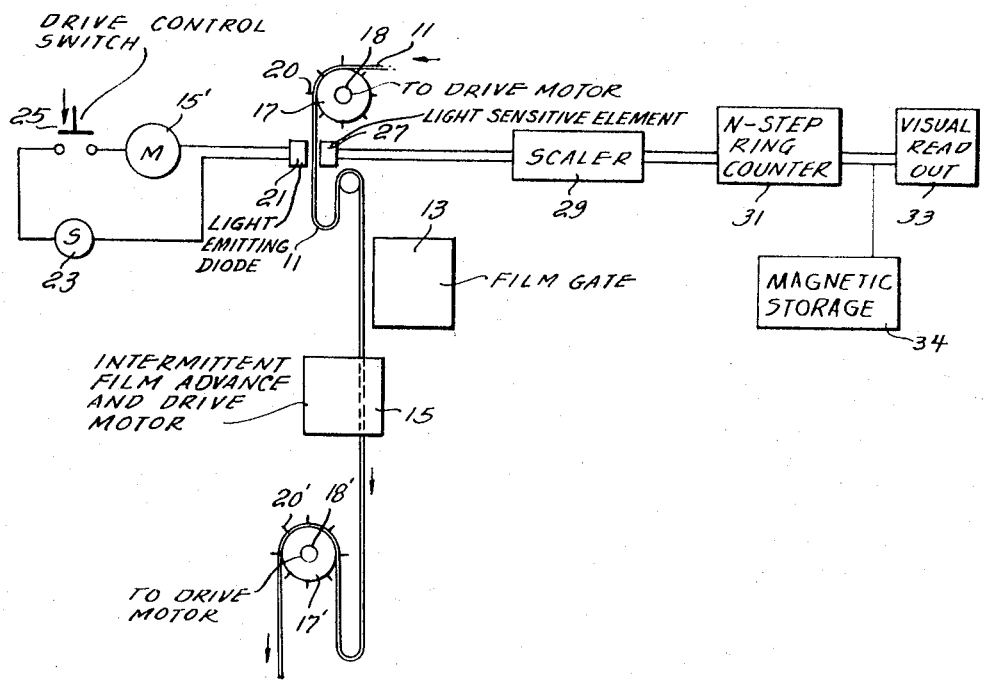

The invention relates to film footage counter and indicator apparatus for use particularly in connection with motion picture film.

Various types of indicating components have already been suggested. Some are purely mechanical; others are either electrical or what may be termed quasi-electric or electronic. In one prior art proposal, a form of footage indicator was proposed with mechanical means controlling an indicating device (usually in a viewfinder) to show either the amount of film exposed or the amount of film remaining unexposed. Another type of prior art device proposed to direct a light beam upon the film perforations thereby determine the rate at which the sprocket holes pass a checking point. This measured value made it possible to sense the rate of film feed into the camera.

The present invention seeks to improve upon indicators of the prior art. In provides a more accurate indication of the film input footage, as well as an indicating means wherein there are no moving parts in the measuring components. Still further, the invention, as constituted, is so arranged that its indicating portion can be remotely positioned relative to the region of film exposure without in any way affecting adversely the operation.

In a preferred form, the invention comprises, in combination with a suitable form of film drive, which per se forms no specific part of the invention, an illuminating means for directing light toward the film strip along the edge of which there is a sequence of substantially uniformly spaced perforations. Usually, for reasons of simplicity, the light is of a color to which the film is substantially insensitive. The light is then directed toward a suitable light sensitive element. The film perforations determine the light which reaches the element. Direct illumination occurs when the light passes directly through the perforations to the light sensitive element. Indirect illumination occurs when reflected light from area between the film produces the control effect. In either case electrical pulse output currents are developed and occur at a frequency coinciding with that at which the film apertures pass the point of illumination. The produced pulses are then supplied to a suitable scaler which, in effect, constitutes a frequency divider. After the frequency is reduced by some suitable factor, the resultant pulse output from the scaler is applied to a suitable counter.

Various forms of counting arrangements may be utilized, but one which is proved satisfactory is in the form of a ring-counter of "$n$" steps of which ($n-1$) steps always remain inactive, "$n$" being an integer. As input pulses are supplied from the scaler successive components of the counter are activated. Finally, after the complete series of "$n$" pulses is applied to the counter, a pulse is impressed upon a suitable readout device, thereby to indicate the conditions causing the initial pulse production. The readout device may be in the form of a light-emitting diode adapted to generate light in the visible range of the spectrum. The light will indicate (depending upon the operating circuit selected) either the film footage exposed or the film footage available for exposure.

Figure 2:
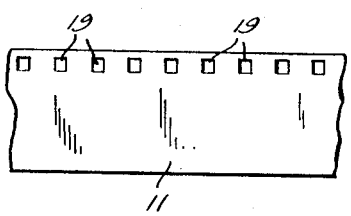

From the foregoing, it will be apparent that among the advantages and objectives of the invention are those of a positive operation free from moving parts; the production of an indicator of exposed film or film available for exposure which may be located in any desired position on the camera apparatus; the provision of a suitable indicating device for which substantially negligible power is required for driving; and the provision of an indicator device of high accuracy which can be installed and operated with a minimum number of components and which occupies a small amount of space. Other objects and advantages will become apparent from a reading of the following description and the accompanying claim in connection with the drawings in which:

FIG. 1 is a schematic illustration of a preferred form of circuit for providing footage indications; and, FIG. 2 is a schematic view of a small section of a film strip to show the general relation of the film perforations relative to the light sensitive film.

Making reference now to the drawings, the conventionally represented film strip 11 is arranged to be moved through a camera mechanism past a film gate 13, shown in block form. The film is suitably exposed for recording images thereon by the use of any form of optical system (not shown), when it is held within the film gate. In the normal course of operation, the film is drawn into and through the film gate by any suitable form of film advance mechanism conventionally shown in block at 15. The film advance mechanism may be of various types but it is usually a standard intermittent type drive permitting a selected number of film exposures per unit of time.

In the course of the film advance, the film is fed from a reel, cartridge, or magazine (not shown) from which it is removed at a substantially constant rate, with the drive being provided by sprocket 17 carried upon the spindle or shaft 18. The sprocket is driven from any suitable drive source (not shown), as is the intermittent mechanism 15. The film edge perforations 19, which are regularly spaced, overlap and register with teeth 20 on the sprockets thereby to withdraw the film from its magazine or cartridge (not shown). A loop is usually formed in the film strip between the sprocket 17 and the film gate 13 through which the film is fed for exposure. This accommodates the film feed to the condition whereby the intermittent drive holds the film stationary within the film gate 13 long enough for exposure but thereafter rapidly withdraws it from the gate preparatory to making the next exposure. A similar condition is obtained following the intermittent drive through the gate since the out-feed is faster than the constant speed withdrawal and storage rate. The sprocket 17' driven by shaft 18' and having teeth 20' takes care of this condition.

A suitable light source, conventionally shown at 21, is positioned adjacent to the film as it is withdrawn from the magazine or cartridge (not shown). This light source may be of various types with one known as a light-emitting diode being particularly suited to the operation. This source is housed and covered with a filter (if necessary) to provide, for instance, a deep red light beam (to which the film is generally insensitive) for direction toward the film perforations.

The light emitting diode 21 is connected in an electrical circuit which is powered from any suitable source, conventionally shown at 23, and which circuit also includes a suitable motor or drive (not shown) for the feed sprockets, as well as the intermittent film pull-down mechanism 15. Operation of each of the film drive by way of the sprocket 17 and the intermittent film pull-down mechanism may be initiated simultaneously by the closure of the switch 25 which connects the pull-down mechanism serially with the diode 21. Operation of the pull-down mechanism is also timed with the rotation of the feed sprocket 17 and the takeup sprocket 17'. This provides an arrangement whereby the illuminating source 21 is activated only during periods of actual film feed and thus, minimizes power requirements.

As the film strip 11 is advanced and subjected to illumination by the source 21, the light of the source for one form of the invention may pass directly through the film perforations 19 to activate a suitable light responsive element, conventionally shown at 27. Th light source 21 and the light sensitive element 27 may be on the same side of the film in a modified form. This latter form provides that light reflected from the film surface during periods of film feed of solid film portions between adjacent perforations reaches the light sensitive element. In cases where the light source and the light sensitive element are on opposite sides of the film, light from the source is permitted to pass directly through the film perforations to the light sensitive element.

The light from the source 21 passing through the perforations 19 is blocked for each portion of the film between adjacent film perforations. Activation of the element 27 occurs during the time the perforation is before the light. Thus, in one case, light from the source is revealed to the light sensitive pick-up by light passing through the apertures or perforations on the film edge and, at other times, the emanating light from the source is reflected from the film.

Various forms of light sensitive elements may be utilized but one which has been found suitable is a so-called silicon detector which is well known in the industry. The silicon detector element 27 produces an output pulse each time it is subjected to illumination. Illustratively, if the film happened to be feeding at a relatively high rate of speed, such as 64 frames per second (for slow motion work), and if it be assumed solely for illustrative purposes that two side perforations 19 are provided in the space occupied by one dimension of each film frame, then it is apparent that the light output from the light sensitive element 27 will be a series of pulses at a frequency of 128 per second. This output is then fed into a scaler, conventionally shown at 29, which is adapted to divide the input frequency in any appropriate manner to produce any reduced selected number of pulses in the time interval in which the initial input series was generated. In the illusrated example, it will be recognized that the assumed 128 pulses per second is equal to binary $2^7$. Therefore, by providing any appropriate number of selected flipflop circuits, this number may readily be resolved to any lower frequency value, such as 2 pulses or even one pulse, or 1 within the stated time period through the use of the scaler.

The scaler output is then supplied to a suitable form of counter circuit, for example, the ring-counter circuit conventionally shown at 31. The ring-counter 31 is of any well known type. It usually consists of any suitable number of stages, such as "$n$," where "$n$" represents any integer. One of the "$n$" stages is "active" at any time period and the remaining ($n-1$) stages are inactive. The "active" generation thus passes to the different stages in sequence. Many forms of ring counters are well recognized in the art. Illustratively, a three-step counter form is shown at page 229 in the "SCR Manual," third edition, published by General Electric Company, 1964. It will be appreciated that while the publication shows a three-step counter such counters may be expanded to any selected number of stages to suit operating conditions. Under the circumstances, each pulse supplied to the ring-counter 31 will advance it one unit in the "on" or "active" position in either a clockwise or counterclockwise direction as desired. Thus, the "on" position of the counter when so indexed or placed will advance systematically as the film 11 is moved through the camera mechanism. The readout indicator 33 which is connected to the output from the ring counter 31 then may provide an output in the visible range by way of illumination of any desired type of light producing component such as a light emitting diode. Depending upon the counter steps and the diode illuminated, an indication of the film footage used or remaining is readily available. The circuitry provides an accurate indication of footage measurement which is free from moving parts with the exception of the film in its motion. This invention affords the opportunity of being able to locate all such elements as the scaler, the ring counter and the readout in any convenient place on the camera equipment.

If the system is constructed as shown, the count of film length is lost whenever the supply of current is interrupted. This requires that the counter circuit be constantly energized, in order that the count be accurate. This arrangement works well where a full roll of film is measured in a short length of time, but where there may be a lengthly interruption in the measurement, such as when picture-taking is stopped for a period of days or weeks, it would be desirable to turn off the power to the counter during the idle period without losing the count.

This can be done if the output of the ring-counter is stored in a magnetic storage matrix shown in block at 34. In this way, when the current is disconnected, the magnetic storage matrix 34 retains the last count. Whenever it is desired to check the count, the magnetic storage need merely be read. When counting is to be resumed, the new counts are added to the stored counts.

The magnetic storage matrix may be of any well-known type, such as ferrite cubes or toroidal cores.

Many and various modifications may be made and utilized within the spirit and scope of what is here disclosed without departing from the substance of the hereappended claim.

I claim:

1. Strip length indicator means for use with a strip of photosensitive film having a series of substantially uniformly spaced perforations in a portion of said strip, said indicator means comprising:
  (a) photoelectric means for generating signals in response to received radiation;
  (b) light emitting diode means for directing radiation toward said photoelectric generating means, said radiation being nonactinic to said film;
  (c) means for advancing said portion between said light emitting diode means and said photoelectric means for generating signals in response to the passage of said perforations between said photoelectric means and said light emitting diode means;
  (d) scaler means having an input and an output, said input being coupled to said photoelectric means, said scaler means being adapted to produce a number of output signals which is a fixed ratio to the number of its input signals;
  (e) a ring counter having $n$ steps and having an input and an output, said counter input being coupled to said scaler output said counter being adapted to produce an output signal following every $n$ input signals, wherein $n$ is a whole number; and (f) read-out means coupled to said counter output for indicating the length of said portion in accordance with said signals.

References Cited

UNITED STATES PATENTS

| | | | |
|---|---|---|---|
| 3,229,103 | 1/1966 | Räntsch et al. | 250—219 X |
| 3,299,272 | 1/1967 | Furukawa et al. | 250—219 |
| 3,316,411 | 4/1967 | Linderman | 250—219 |
| 3,319,051 | 4/1967 | Renold | 250—219 |

RALPH G. NILSON, Primary Examiner

T. N. GRIGSBY, Assistant Examiner

U.S. Cl. X.R.

235—98.5; 250—83.3, 219, 223